US012634816B2

(12) United States Patent
Rabello et al.

(10) Patent No.: US 12,634,816 B2
(45) Date of Patent: May 19, 2026

(54) COMMUNICATION INTERFACE FOR A CELLULAR BASE STATION

(71) Applicant: Outdoor Wireless Networks LLC, Claremont, NC (US)

(72) Inventors: Jose Antonio Torres Rabello, Orland Park, IL (US); John T. Hanley, Orland Park, IL (US); Ronald J. Bianchi, Frankfort, IL (US); David Winkler, Alexandria, VA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 309 days.

(21) Appl. No.: 18/549,075

(22) PCT Filed: Mar. 3, 2022

(86) PCT No.: PCT/US2022/018705
§ 371 (c)(1),
(2) Date: Sep. 5, 2023

(87) PCT Pub. No.: WO2022/187485
PCT Pub. Date: Sep. 9, 2022

(65) Prior Publication Data
US 2024/0172110 A1 May 23, 2024

Related U.S. Application Data

(60) Provisional application No. 63/192,812, filed on May 25, 2021, provisional application No. 63/157,443, filed on Mar. 5, 2021.

(51) Int. Cl.
*H04W 52/02* (2009.01)
*H04W 84/04* (2009.01)
*H04W 88/08* (2009.01)

(52) U.S. Cl.
CPC ...... *H04W 52/0206* (2013.01); *H04W 84/047* (2013.01); *H04W 88/085* (2013.01)

(58) Field of Classification Search
CPC ........... H04W 52/0206; H04W 84/047; H04W 88/085
See application file for complete search history.

(56) References Cited

U.S. PATENT DOCUMENTS 9,448,576 B2    9/2016   Chamberlain et al.
9,824,474 B2   11/2017   Smith et al.
(Continued)

FOREIGN PATENT DOCUMENTS

WO      2018024164 A1     2/2018
WO      2022187485 A1     9/2022

OTHER PUBLICATIONS

International Searching Authority, "International Search Report and Written Opinion", from PCT Application No. PCT/US2022/018705, Jun. 20, 2022, pp. 1 through 12, Published: WO.

*Primary Examiner* — Gbemileke J Onamuti
(74) *Attorney, Agent, or Firm* — Fogg & Powers LLC

(57) ABSTRACT

A cellular base station that includes a baseband unit, at least one programmable power supply and a communication interface is provided. The baseband unit is in communication with a backhaul communication system and a radio. The at least one programmable power supply is configured to provide power to the radio through a communication circuit. The communication interface is in communication with the programmable power supply. The communication interface is configured to provide communications between the programmable power supply and a remote location regarding the communication circuit.

20 Claims, 8 Drawing Sheets

(56)     References Cited

U.S. PATENT DOCUMENTS

| | | | |
|---|---|---|---|
| 10,812,664 | B2 | 10/2020 | Kostakis et al. |
| 11,129,095 | B2 | 9/2021 | Gandhi |
| 2003/0137277 | A1 | 7/2003 | Mori et al. |
| 2014/0330511 | A1 | 11/2014 | Tison et al. |
| 2016/0055473 | A1 | 2/2016 | Lin et al. |
| 2017/0076504 | A1 | 3/2017 | Oar et al. |
| 2018/0375374 | A1 | 12/2018 | Ito et al. |
| 2019/0041637 | A1 | 2/2019 | German et al. |
| 2019/0391192 | A1 | 12/2019 | Winkler et al. |

ESTABLISH WIRELESS COMMUNICATION LINK
BETWEEN THE WIRELESS COMMUNICATION
INTERFACE AND A MOBILE DEVICE
602

COMMUNICATE CELLULAR BASE STATION
INFORMATION TO THE WIRELESS COMMUNICATION
INTERFACE
604

COMMUNICATE THE CELLULAR BASE STATION
INFORMATION WIRELESSLY TO A REMOTE LOCATION
606

COMMUNICATION INTERFACE FOR A CELLULAR BASE STATION

CROSS-REFERENCE TO RELATED APPLICATIONS

This Application is a 371 National Stage Application of PCT Application No. PCT/US2022/018705, same title herewith, filed on Mar. 3, 2022, which claims priority to U.S. Provisional Application Ser. No. 63/157,443, same title herewith, filed on Mar. 5, 2021, and to U.S. Provisional Application Ser. No. 63/192,812, same title herewith, filed on May 25, 2021, both of which are incorporated in their entirety herein by reference.

BACKGROUND

Cellular base stations typically include, among other things, a radio, a baseband unit, and one or more antennas. The radio receives digital information and control signals from the baseband unit and modulates this information into a radio frequency ("RF") signal that is then transmitted through the antennas. The radio also receives RF signals from the antenna and demodulates these signals and supplies them to the baseband unit. The baseband unit processes demodulated signals received from the radio into a format suitable for transmission over a backhaul communications system. The baseband unit also processes signals received from the backhaul communications system and supplies the processed signals to the radio. A power supply may also be provided that generates suitable direct current ("DC") power signals for powering the baseband unit and the radio. For example, the radio is often powered by a (nominal) 48 Volt DC power supply in cellular systems that are currently in use today. A battery backup is also typically provided to maintain service for some period of time during power outages.

In order to increase coverage and signal quality, the antennas in many cellular base stations are located at the top of a tower, which may be, for example, about fifty to two hundred feet tall. Until fairly recently, the power supply, baseband unit and radio were all located in an equipment enclosure at the bottom of the tower to provide easy access for maintenance, repair and/or later upgrades to the equipment. Coaxial cable(s) were routed from the equipment enclosure to the top of the tower that carried signal transmissions between the radio and the antennas.

In recent years, the radio has more typically been located at the top of the tower in new or upgraded cellular installations. Radios that are located at the top of the tower are typically referred to as remote radio heads ("RRHs"). Using RRHs may significantly improve the quality of the cellular data signals that are transmitted and received by the cellular base station as the use of RRHs may reduce signal transmission losses and noise. In particular, as the coaxial cable runs up the tower may be 100-200 feet or more, the signal loss that occurs in transmitting signals at cellular frequencies (e.g., 1.8 GHZ, 3.0 GHZ, etc.) over the coaxial cable may be significant. Because of this loss in signal power, the signal-to-noise ratio of the RF signals may be degraded in systems that locate the radio at the bottom of the tower as compared to cellular base stations where RRHs are located at the top of the tower next to the antennas (note that signal losses in the cabling connection between the baseband unit at the bottom of the tower and the RRH at the top of the tower may be much smaller, as these signals are transmitted at baseband frequencies as opposed to RF frequencies).

While the use of tower mounted RRHs may improve signal quality, it also, unfortunately, requires that DC power be delivered to the top of the tower to power the RRH. In some cases, the DC power may be delivered over a coaxial cable that also carries communications between the baseband unit and the RRH. Other systems may use a fiber optic cable as a communication link between the baseband unit and the RRH (as fiber optic links may provide greater bandwidth and lower loss transmissions), and a separate power cable is provided for delivering the DC power signal to the RRH. The separate power cable is typically bundled with the fiber optic cable so that they may be routed up the tower together.

SUMMARY

The following summary is made by way of example and not by way of limitation. It is merely provided to aid the reader in understanding some of the aspects of the subject matter described. Embodiments provide a communication interface that is used to convey information between a cellular base station and a remote location such as a remote server.

In one embodiment, a cellular base station that includes a baseband unit, at least one programmable power supply and a communication interface is provided. The baseband unit is in communication with a backhaul communication system and a radio. The at least one programmable power supply is configured to provide power to the radio through a communication circuit. The communication interface is in communication with the programmable power supply. The communication interface is configured to provide communications between the programmable power supply and a remote location regarding the communication circuit.

In another example embodiment, a cellular base station system including at least one remote radio head located at a top of a tower, a baseband unit, a power cable for each radio head, at least one programmable power supply, and communication interface is provided. The baseband unit is in communication with a backhaul communication system. The baseband unit is further in communication the at least one remote radio head. Each power cable is coupled to provide power to an associated remote radio head. The at least one programmable power supply is coupled to provide power to each power cable. The communication interface is in communication with the programmable power supply. The communication interface is configured to provide communications between the programmable power supply and a remote server.

In yet another embodiment, a method of communicating with a programmable power supply of a cellular base station is provided. The method includes entering in a device identifier with a mobile device; scanning in an identification marker; verifying if the entered device identifier is associated with the scanned identification marker; and establishing a wireless communication link between the mobile device and the programmable power supply.

In further another embodiment, a method of providing cellular base station information to a remote location is provided. The method includes gathering information related to at least one communication circuit that provides power to an associated remote radio head with a controller of a programmable power supply; and communicating the gathered information through a communication interface to a remote location.

BRIEF DESCRIPTION OF THE DRAWINGS

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a communication interface that provides a communication link between a cellular base station and a remote location. In one example, the communication interface is in communication with controller of a programmable voltage supply of the cellular base station. In embodiments the interface may be used to gather operation information from the cellular base station as well as provide provisioning instructions to the programmable voltage supply. The operation information may include base station status information, power consumption information as well as other information that can be used at a remote location. In some embodiments the communication interface is a wireless interface.

Figure 1A:
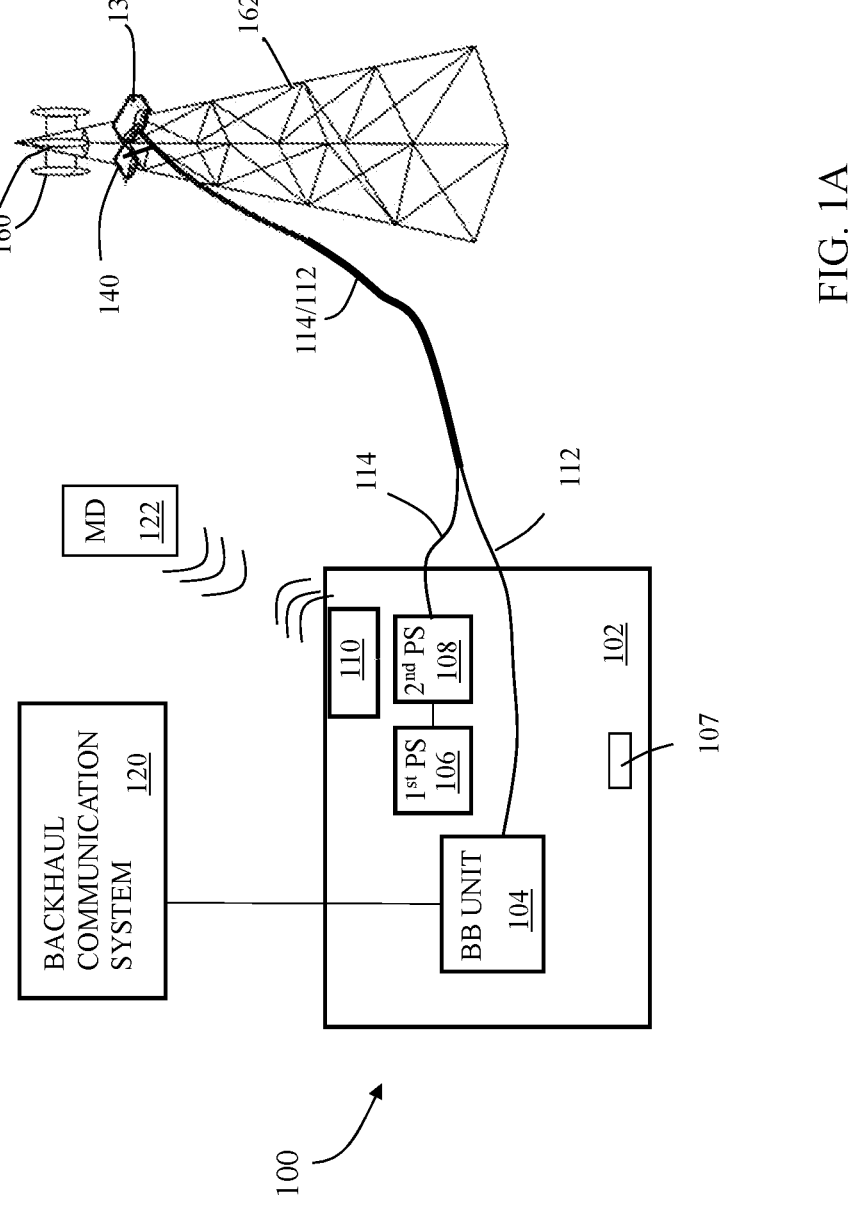
FIG. 1A illustrates a cellular base station according to one exemplary embodiment.

A cellular base station 100 that includes a communication interface 110 of an example embodiment is illustrated in FIG. 1A. This example of the cellular base station 100 includes an enclosure 102 (e.g., a vault, cabinet, housing, etc.). Within the enclosure 102, in this example, is a baseband unit 104, first and second power supplies 106 and 108 and the communication interface 110. The baseband unit 104 is in communication with a backhaul communication system 120 that communicationally couples the cellular base station 100 to a core network of one or more cellular providers. Also illustrated in FIG. 1A is a tower 162. At the top of the tower 162 is a plurality of antennas 160. The antennas 160 may be passive (unpowered), in one example, so no power is needed. Further in one embodiment the antennas are sectorized antennas 160.

Mounted near the top of the tower 162, in this example, is a radio, or RRH 130, that is in communication with the antennas 160. The equipment enclosure 102 may be located at the base of the tower 162 as shown in FIG. 1A or may be positioned on the tower 162 in another embodiment. If the enclosure is remote from the RRH 130 as illustrated in FIG. 1A, the enclosure includes a direct current (DC) boost voltage converter (that may be included in one of the power supplies 106 and 108) that increases DC voltage to compensate for DC voltage drop in electrical conductors connecting the radio to the voltage converter. If the voltage converter is near the radio (e.g., on the tower), then the input DC voltage may be high (e.g., 100-300V). The higher voltage diminishes current flow in the electrical connectors (thus reduces the voltage drop in the cable). The voltage converter in this configuration will reduce the voltage by a desired amount, for example, to 54 V.

A cable 112 (which may be a fiber optic cable or a coaxial cable or the like) communicatively couples the baseband unit 104 to the RRH 130. A power cable 114 couples the power supply 108 to the RRH. A portion of the cables 112 and 114 running up the tower 162 may be wrapped together as indicated by 114/112.

Figure 2:
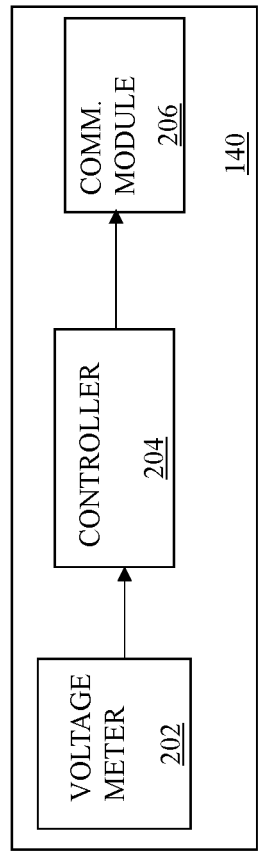
FIG. 2 illustrates a block diagram of a DC power signal voltage control module according to one exemplary embodiment.

The example cellular base station 100 further includes a DC power signal voltage control module 140 that may be co-located with the RRH 130. The DC power signal voltage control module 140 may be located, for example, at or near the top of the tower 162. The power signal voltage control module 140 may be a standalone unit or may be integrated with other equipment such as, for example, the RRH 130. In an example embodiment, the DC power signal voltage control module 140 may include a voltage meter 202, a controller 204 and a communications module 206 as illustrated in FIG. 2. The voltage meter 202 may be used to monitor the voltage of the DC power signal at the far end of the power cable 114 (i.e., at the top of the tower 162). Any appropriate voltage meter may be used that is capable of measuring the voltage of the DC power signal at the far end of cable 114 (or at another location proximate the RRH 130). Further any type of measuring device that measures other parameters that can be used to determine the voltage of the DC power signal at the far end of cable 114 may also be used.

The voltage meter 202 may supply the measured voltage, or other parameter, to the controller 204 of the DC power signal voltage control module 140. The meter controller 204 may then control the communications module 206 to transmit the measured or calculated voltage of the DC power signal at the far end of power cable 114 to, for example, the second power supply 108. The controller 204 may comprise any appropriate processor, controller, ASIC, logic circuit or the like. The communications module 206 may comprise a wired or wireless transmitter. In some embodiments, the communications module 206 may comprise a wireless Bluetooth transmitter or a cellular transmitter. In other embodiments, the communications module 206 may communicate with the second power supply 108 over a separate wired connection. In still other embodiments, the communications module 206 may communicate with the second power supply 108 by modulating a signal onto the power cable 114. In each case, the communications module 206 may transmit the measured or calculated voltage of the DC power signal at the far end of power cable 114 to the second power supply 108.

In one example embodiment, the measured or calculated voltage of the DC Power signal at the far end of the power cable 114 is communicated to a controller of the programmable power supply 108 as described below. The second power supply 108 may adjust the voltage of the DC power signal that it outputs in response to these communications in order to generally maintain the voltage of the DC power signal at the far end of power cable 114 at a desired and/or pre-selected level. Thus, in this embodiment, an active feedback loop may be used to maintain the voltage of the DC power signal at the far end of power cable 114 at the pre-selected level.

While the embodiments that have been described above deliver a DC power signal over the power cable 114, it will be appreciated that in other embodiments, an AC power signal may be used instead. For example, if the RRH 130 is designed to be powered by an AC power signal as opposed to a DC power signal, then the power supply 108 may output an AC power signal as opposed to a DC power signal but may otherwise operate in the same fashion. Likewise, in embodiments that includes a DC-to-DC converter at the top of the tower 162, an AC-to-DC converter may be used instead or, if the RRH 130 is designed to be powered by an AC power signal, the DC-to-DC converter may be replaced with a Buck AC-to-AC converter. Thus, it will be appreciated that the embodiments illustrated in the figures are exemplary in nature and are not intended to limit the scope of the present invention.

Figure 1B:
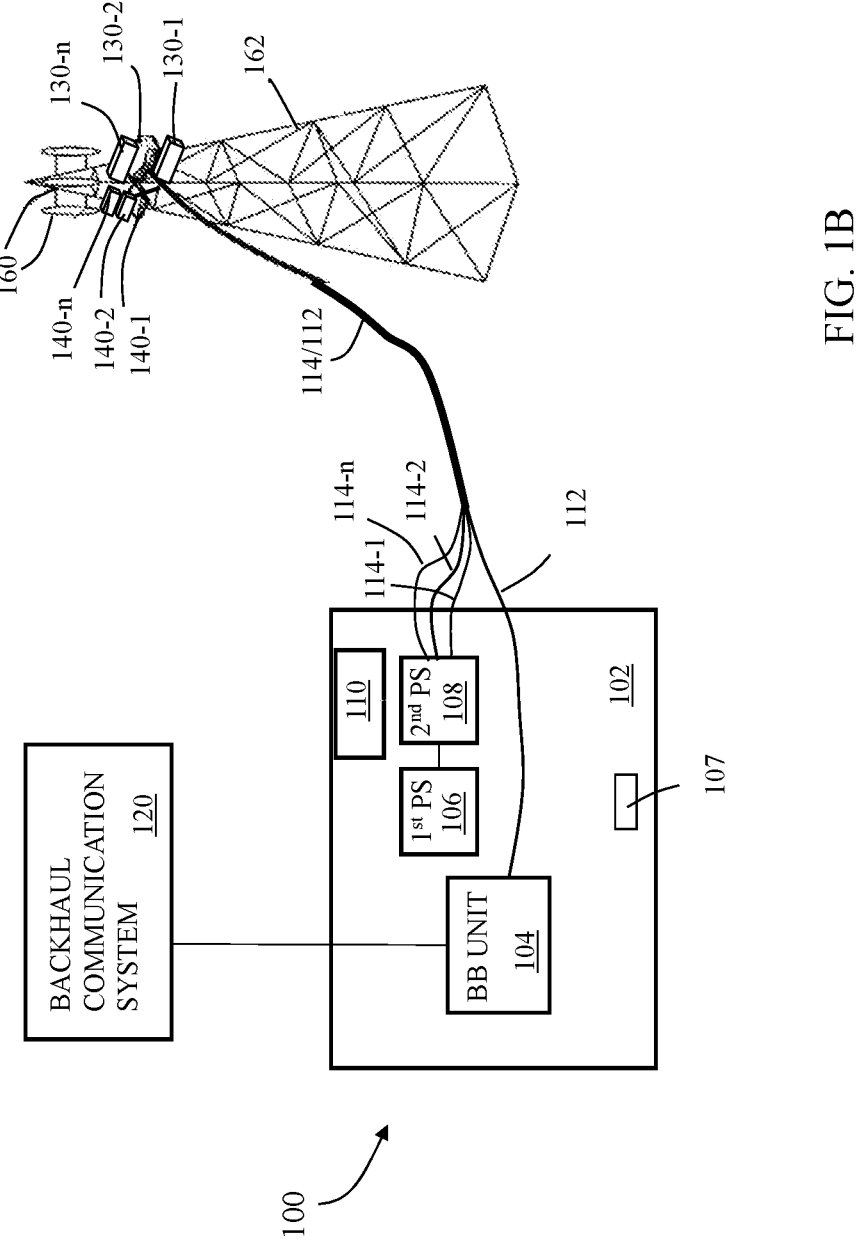
FIG. 1B illustrates a cellular base station supporting a plurality of radio operators according to one exemplary embodiment.

FIG. 1A illustrates an example with one communication circuit that includes a single power cable 114 that connects the power supply 108 to the RRH 130. A typical system, however, may include more than one communication circuit. For example, a tower 162 may support three or more radios owned by one radio operator and three or more radios owned by a different radio operator. Each communication circuit would include its own dedicated power cable 114. FIG. 1B illustrates an example, of a system that provides services for a plurality of communication circuits from one or more radio operators. As discussed, the service for each communication circuit includes its own associated power cable 114-1 through 114-$n$. Each power cable 114-1 through 114-$n$ (generally referred to by 114) couples power between the second power supply 108 and an associated RRH 130-1 through 130-$n$ (generally referred to by 130). Each RRH may have its own associated voltage control module 140-1 through 140-$n$ (generally reference to by 140) as illustrated in FIG. 1B.

Figure 3:
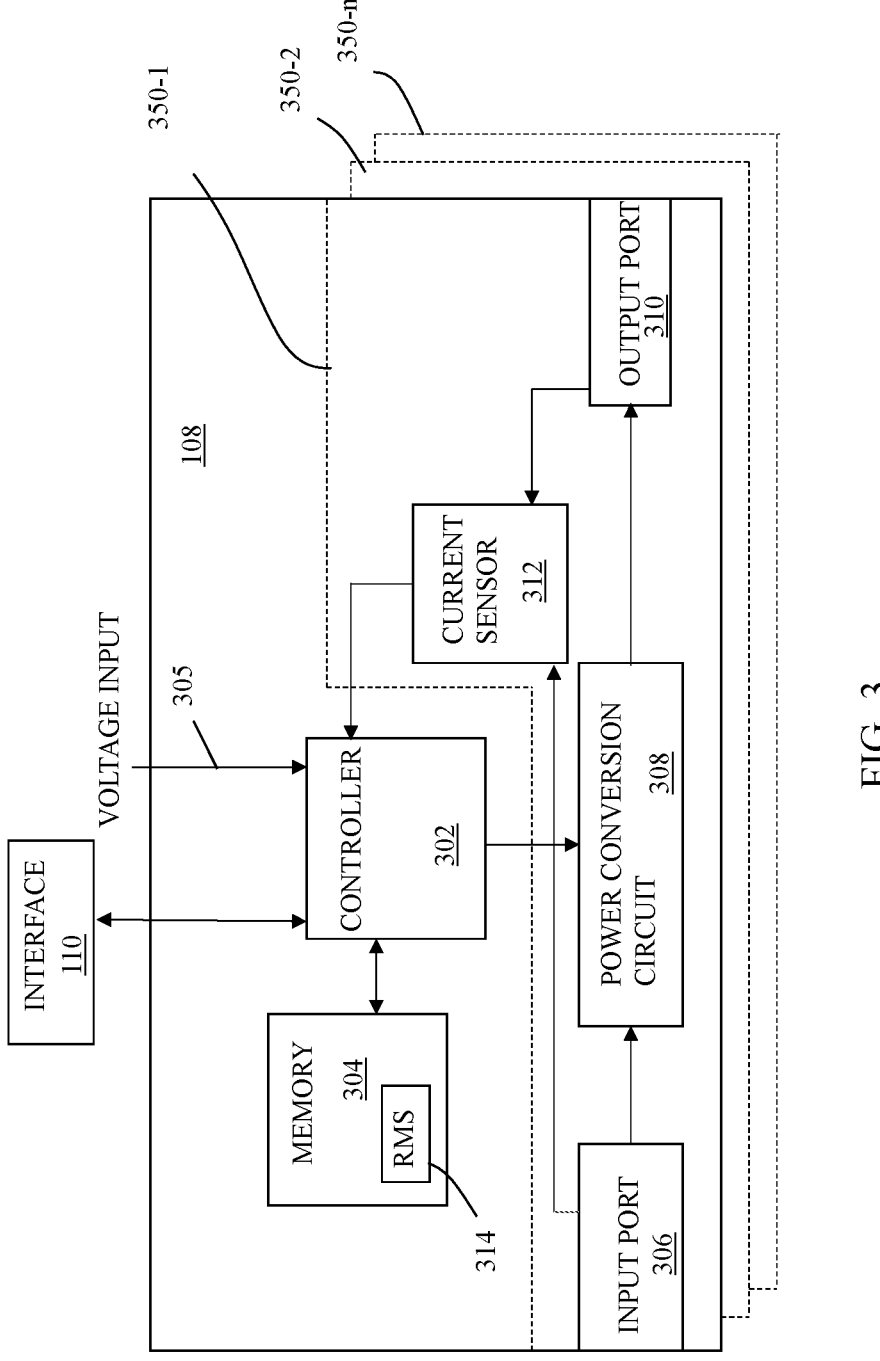
FIG. 3 illustrates a block diagram of a programmable power supply according to one exemplary embodiment.

An example of power supply 108 is illustrated in the block diagram of FIG. 3. The programmable power supply 108 may be in the form of a DC-to-DC converter according to certain embodiments of the present invention. As shown in FIG. 3, the programmable power supply 108, in this example, includes an input port 306, a power conversion circuit 308 and an output port 310. The power supply 108 further includes a current sensor 312, a controller 302, a memory 304 as well as a voltage input 305 to the power controller 302 that provides the measured or calculated voltage of the DC Power signal at the far end of the power cable 114 as discussed above.

In general, the controller 302 may include any one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to the controller 302 herein may be embodied as software, firmware, hardware or any combination thereof. The controller 302 may be part of a system controller or a component controller. The memory 304 may include computer-readable operating instructions that, when executed by the controller 302 provides functions of the programmable power supply 108. Such functions may include the functions of maintaining a select voltage level at a RRH 130, gathering communication circuit information and communicating the gathered information through the communication interface to a remote location as described below. The computer readable instructions may be encoded within the memory. Memory is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically-erasable programmable ROM (EEPROM), flash memory, or any other storage medium.

The input port 306 receives an input power signal, such as the DC power signal output by the first power supply 106 of FIG. 1. The first power supply 106 may include a DC power rectifier in one embodiment. The input power signal that is received at input port 306 may be a DC power signal having a relatively constant voltage in some embodiments. The conversion circuit 308 may be a circuit that is configured to convert the voltage of the input power signal received at input port 306 to a different DC voltage. A wide variety of DC conversion circuits are known in the art, including, for example, electronic, electrochemical and electromechanical conversion circuits. Most typically electronic circuits using inductors or transformers are used to provide high efficiency voltage conversion. The output port 310 outputs an output power signal that includes the converted voltage to a respective power cable 114 to provide power to operate an associated RRH 130.

The current sensor 312 may be any appropriate circuit that senses the current level of the DC power signal output through the output port 310. The current drawn by an associated RRH 130 may vary over time depending upon, for example, the number of carriers that are transmitting at any given time and whether the RRH 130 is in a steady-state mode, powering up or rebooting. The current sensor 312 may sense the current level of the DC power signal at output port 310 and provide the sensed current level to the controller 302. The controller 302 (or power controller 302) may then adjust parameters of the power conversion circuit 308 so as to adjust the voltage of the DC power signal output through output port 310 so that the voltage at the far end of the power cable 114 that is attached to output port 310 may remain substantially constant despite changes in the current drawn by an associated RRH 130 and corresponding changes in the voltage drop that occurs over the associated power cable 114.

In embodiments that have a plurality of communication circuits include a plurality of power communication circuits 350-1 through 350-$n$. Each power communication circuit 350-1 through 350-$n$ may include its own input port 306, power conversion circuit 308, output port 310 and current sensor 312. Each output port 310 is coupled to an associated power cable 114-1 through 114-$n$ of an associated communication circuit. The controller 302 and memory 304 may be shared between the different power communication circuits 350-1 through 350-$n$ (generally referred to by 150) in embodiments. Generally, each communication circuit includes a power communication circuit 350, an associated power cable 114, an associated RRH 130 and an associated DC power signal voltage control module 140. Each radio operator may use one or more of the communication circuits.

While the example power supply 108 of FIG. 3 comprises a DC-to-DC converter, it will be appreciated that in other embodiments an AC-to-DC converter may be used instead.

In such embodiments, the input port 306 receives an alternating current ("AC") power signal and the conversion circuit 308 converts the AC power signal to a DC power signal and also adjusts the voltage level of the DC power signal that is output through output port 310 to an appropriate level in the manner discussed above. It will also be appreciated that the power supply 108 may alternatively include an AC-to-DC converter.

In embodiments, the voltage of the output power signal that is output by the programmable power supply 108 may be set so that the voltage at the far end of an associated power cable 114 remains at or near a predetermined voltage level that is just under a maximum power signal voltage level that the associated RRH 130 may handle. In order to achieve this, it is necessary to know the voltage drop that the DC power signal will experience traversing the associated power cable 114, as this voltage drop affects the voltage of the DC power signal at the far end of the power cable 114. In some embodiments, the user input port 306 to the power supply 108 allows a user to input a cumulative resistance value for the power cable 114 which the user may obtain by, for example, calculation (based on the length, size and material of the conductor of the associated power cable 114), measurement (done, for example, by transmitting a signal over the power cable 114 and measuring the voltage of the signal output at the far end of the power cable 114) or a combination thereof (e.g., measuring or estimating a cumulative impedance value for the power cable 114 and converting this cumulative impedance value into a cumulative resistance value). In other embodiments, the user may input physical characteristics of the associated power cable 114 such as size, length, conductor material, model number, etc.) and algorithms, equations, look-up tables and the like that are stored in the memory 304 of the power supply 108 may be used to calculate or estimate the resistance of the power cable 114.

In some embodiments, the second power supply 108 may further be configured to measure a resistance of the power cable 114. In one example, the programmable power supply 108 may execute a cable resistance measurement circuit function 314 that is stored in memory 304 to determine a resistance of an associated power supply cable 114. The cable resistance measurement function 314 may be implemented in a variety of ways. For example, in some embodiments, the cable resistance measurement function 314 may direct the controller 302 to cause the power conversion circuit 308 to transmit a voltage pulse onto an associated power cable 114 and measure the reflected return pulse (the far end of the power cable may be terminated with a termination having known characteristics) with use of the current sensor 312. The current of the voltage pulse may be measured, as well as the voltage level of the reflected return pulse. The voltage controller 302 may then apply Ohm's law to calculate the resistance of the power cable 114. In other embodiments, at the far end of the associates power cable 114, the two conductors thereof may be shorted, and a voltage pulse may again be transmitted through the power cable 114. The current level of the pulse and the voltage level of the return pulse may be measured and the voltage controller 302 may again use these measured values to calculate the resistance of the power cable. In other embodiments, the DC resistance can be measured by transmitting alternating current signals at different frequencies over the power cable 114 and measuring the amplitude and phase shift of these signals at the far end of the cable 114. The DC resistance may then be calculated using the measured results. Other ways of measuring the resistance of a wire segment are known to those of skill in the art and may be used instead of the example methods listed above.

It will also be appreciated that in other embodiments the resistance measurement function 314 may measure an impedance of the power cable and use this measured impedance value to determine the resistance of the power cable. Further in embodiments, the controller 302 implements instructions stored in the memory to track power consumption. This information may be used to generate a bill to a radio operator for the power used in their associated communication circuits. In one example, the controller 302 uses the current sensor 312 to track currents and voltages at both the input port 306 and the output port of each 310 of each power communication circuit 350-1 through 350-n. Using the information from the current sensor 312, the rate in which current flows is tracked to determine an amount of power (in Watts) used over a period of time. The usage amount may by communicated to a remote location via the interface 110. Other system of tracking the current flow to determine power usage may be used.

In the example embodiment of the programmable power supply 108 of FIG. 3, the power controller 302 is communicatively coupled to communication interface 110. The communication interface 110 in one example embodiment may be a wireless communication interface that is in turn configured to provide a wireless communication link to a mobile device 122 (as illustrated in FIG. 1) in one example embodiment. In one embodiment, the mobile device 122 (e.g., portable computing device such as a smart phone, phablet, tablet, laptop, etc.) includes an application that is executed to establish the wireless communication link with the wireless interface 110. Besides the mobile device 122 being able to communicate with the programmable power supply 108, the mobile device 122 may also be configured to be in communication with a remote server, cloud computing system, etc. through wired and wireless interfaces. For example, a smart phone can connect to the remote server or cloud computing system through a wide area network (e.g., cellular network) and the wireless interface 110 though a local or personal area network, e.g., Wi-Fi or Bluetooth. Each cellular base station 100 (or a part or unit of the cellular base station 100) may be labeled with a unique identifier such as a serial number, e.g., represented by a QR code. The mobile device 122 and/or the application on the mobile device 122 may include a camera and image processing software to ascertain the unique identifier. The mobile device and/or the application on the mobile device may be preloaded with information about power cable(s) connecting the programmable power supply 108 to radio(s) 130. Such information may be data pertaining to cable resistance (a cable resistance or cable parameter(s) from which a resistance of each cable may be estimated), cable current safety rating (maximum cable current or parameters from which maximum cable current may be derived, and optionally temperature derating information). Alternatively, an installer may obtain cable gauge, cable, length, and/or cable resistance, e.g., from documentation at a cell site, and enter such information into the application on the mobile device 122. Thus, optionally, the application may have to calculate the cable resistance and/or maximum cable current from cable parameter(s). Upon detecting the unique identifier of a unit of the cellular base station 100, the application and mobile device may automatically communicate (e.g., through the LAN or PAN), a cable resistance (and optionally information related to a maximum current of the power cables) to a controller of a programmable power supply or other controller of the cellular base station. Optionally, the application may include step by step installation instructions for a technician to follow. In one embodiment, the application includes a security to prevent access form unauthorized users. For example, as discussed below, a communication link will not be established between the mobile device and the wireless interface until a device identifier is entered into the application that is verified to be associated with a scanned in identification marker 107 (shown in FIG. 1).

Figure 4:
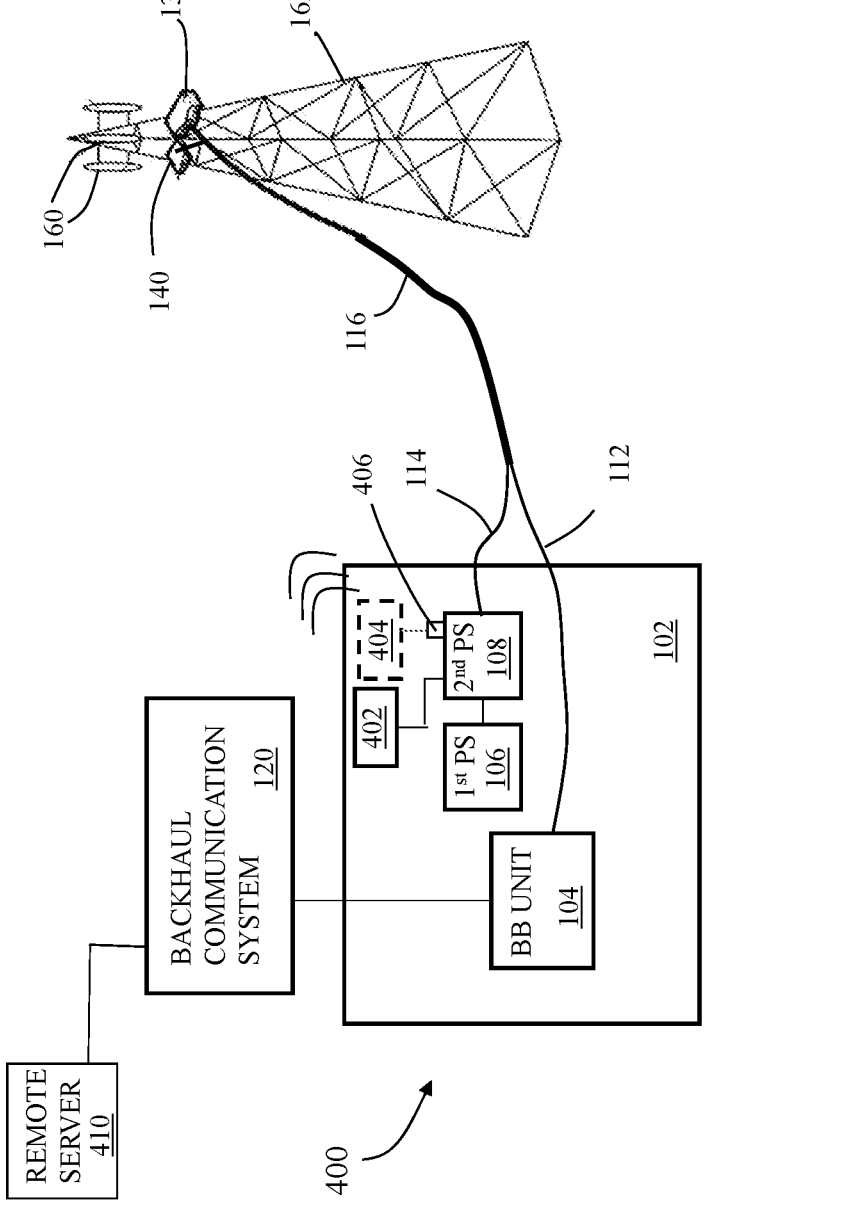
FIG. 4 illustrates another cellular base station according to one exemplary embodiment.

Another embodiment of a cellular base station 400 is illustrated in FIG. 4. In this embodiment the wireless interface 402 includes a cellular transmitter, or the like, to communicate cellular base station information to a remote location, such as remote server so that the cellular base station 100 can be monitored and programmed remotely. This example embodiment is used when operators desire to monitor DC voltage and current levels supplied to radios of a cellular base station 400 at a remote location. When there is no wired Internet at a cell site, network operators may connect a computer (or remote server) to monitor the DC voltage and current levels. The remote server may be connected to the cellular network by wireless means (e.g., cellular radio). It is desirable to reduce the cost and complexity to permit the network operator to wirelessly monitor DC voltage and current levels, and also allow the network operator to wirelessly and remotely program the programmable power supply 108.

Embodiments may connect the cellular radio to the programmable power supply 108 by wired or wireless (e.g., Bluetooth or Wi-Fi). For example, a cellular phone, such as mobile device 122 of FIG. 1, may be wirelessly connected to a controller of the programmable power source 108 by adding a suitable wireless interface 402 (e.g., Bluetooth or Wi-Fi). Alternatively, a USB cellular radio 404 may be in communicatively coupled to the controller of the programmable power supply 108 by plugging it into a USB slot 406 or the like. Optionally, the cellular radio 404 may provide data to a server, such as remote server 410 (a remote computer) or the Cloud. The cellular radio 404 provides a network operator DC voltage and current data of the cellular base station 400. The cellular radio 404 also may provide alarm data (due to over or under voltage or current, excessive temperature, unit failure, etc.). Optionally, DC data can be sent periodically or upon request of the network operator. Optionally, the network operator can program the programmable power supply 108, e.g., with new power cable data, e.g., power cable resistance or power cable characteristics (e.g., length and gauge); also, optionally, the network operator can program the periodicity of when the programmable power supply 108 sends DC voltage and current data to the network operator. The DC voltage and current data may include input and/or output voltage and current data. DC voltage and current data is provided for each voltage boosting circuit of the cellular base station 400. The cellular base station 400 may include one or more voltage boosting circuits. For example, input voltage levels may indicate when to utilizes (or not to utilize) battery backup power, and the time period that the cellular base station 400 has been operating with a particular DC parameter, e.g., input voltage level.

Further, examples discussed above discuss the communication of the interface with a controller of a programmable power source to retrieve and provide information regarding the operation of the cellular data base, one or more controllers in other locations that have access to the information may also be used.

Figure 5:
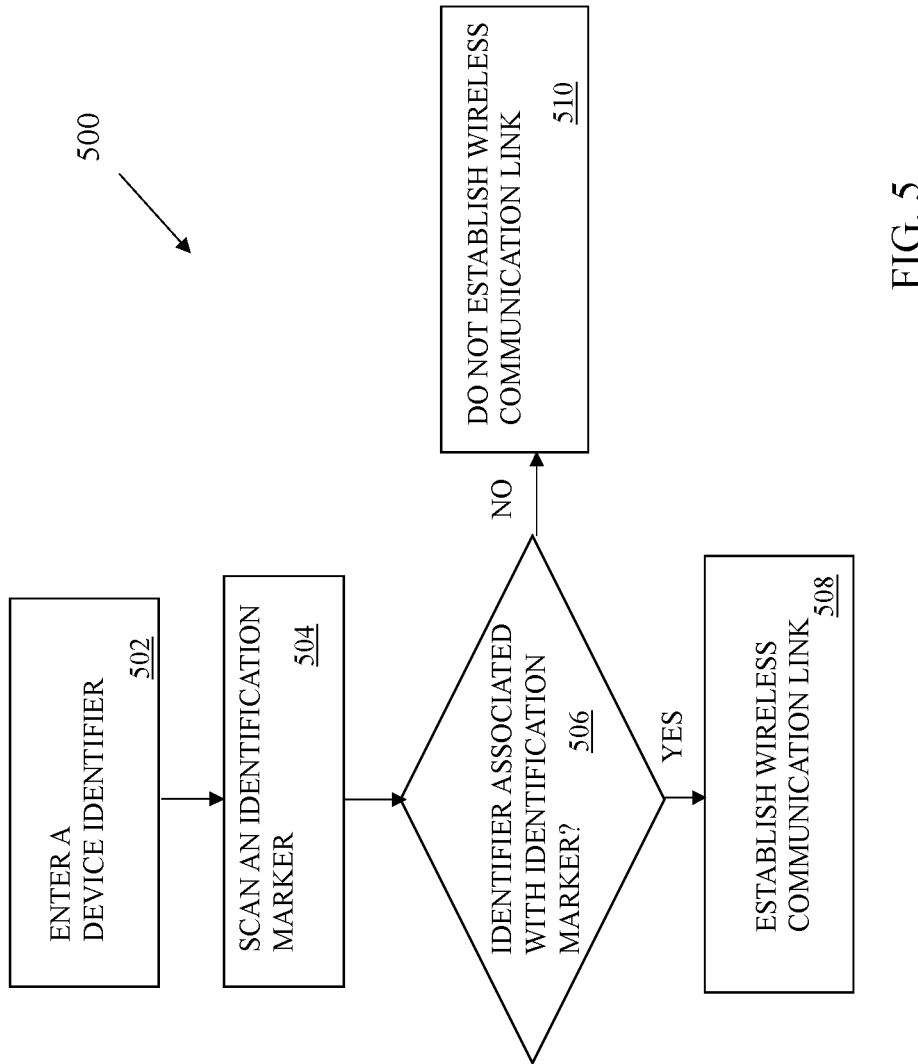
FIG. 5 illustrates a verification flow diagram according to one exemplary embodiment.

Referring to FIG. 5, a verification flow diagram 500 of an example embodiment is illustrated. The verification flow diagram is provided in a series of blocks. The sequence of the block may occur in a different order or in parallel in other embodiments. The Flow diagram 500 starts at block 502 where a technician enters into a mobile device 122 a device identifier. The device identifier may be associated with, for example, the cellular base station 100, the enclosure 102 that includes components of the cellular base station 100, a component of the cellular base station 100 (such as the programmable power source 108) etc. In this Example, the mobile device 122 includes a camera to scan an identification marker 107 as indicated in block 504. An application in the mobile device 122 determines if the entered device identifier is associated with the scanned in identification marker at block 506. If an association is not found at block 506, a communication link between the mobile device 122 and the cellular base station 100 is not established at block 510. If an association is found at block 506, a communication link between the mobile device 122 and the cellular base station 100 is established at block 508.

Figure 6:
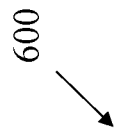
FIG. 6 illustrates a communication flow diagram according to one exemplary embodiment.
Figure 6:
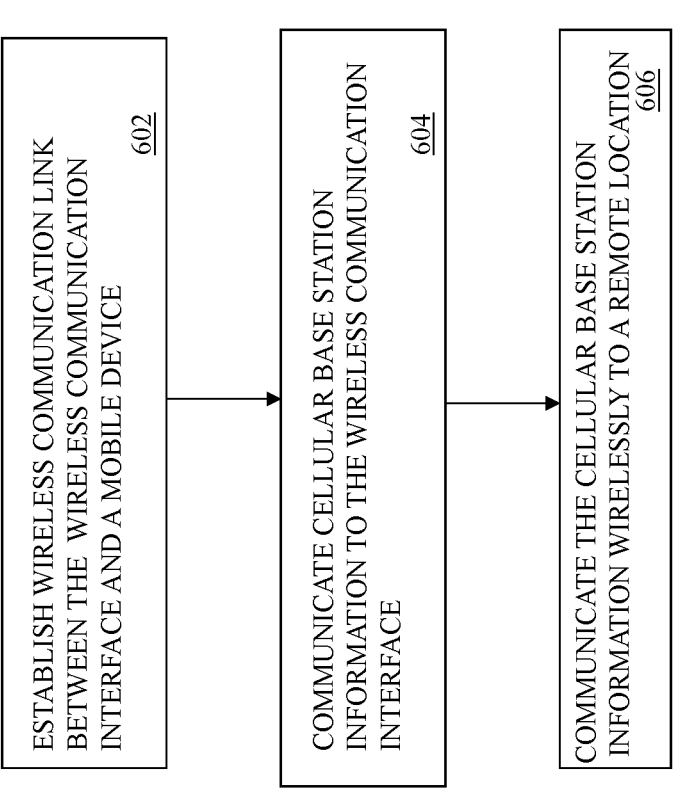

Once verification is established with the verification flow diagram 500, communications between the mobile device 122 and the cellular base station 100 can occur in an example embodiment. FIG. 6 illustrates a communication flow diagram 600 of an example embodiment. The communication flow diagram 600 is provided in a series of blocks. The sequence of the block may occur in a different order or in parallel in other embodiments. The communication flow diagram 600 example includes block 602 where a communication link between a wireless interface, such as wireless interface 110, and the mobile device 122 is established. Communications relating to cellular base station information can then be exchanged between the mobile device 122 and the cellular base station 100 at block 604. Further in an embodiment, cellular base station information may be communicated to a remote location, such as a remote server, via the mobile device at block 606. The cellular base station information may include information relating to initially configuring the programmable power supply 108, current measurements (including the voltage of the DC power signal at the far end of the power cable 114), or other desired information. As discussed above, information sent to a remote server can be scheduled periodically and/or by request of a network operator. As also discussed above, the network operator may configure operations of the cellular base station 100 remotely via the mobile device 122 and wireless interface 110 communication link.

Figure 7:
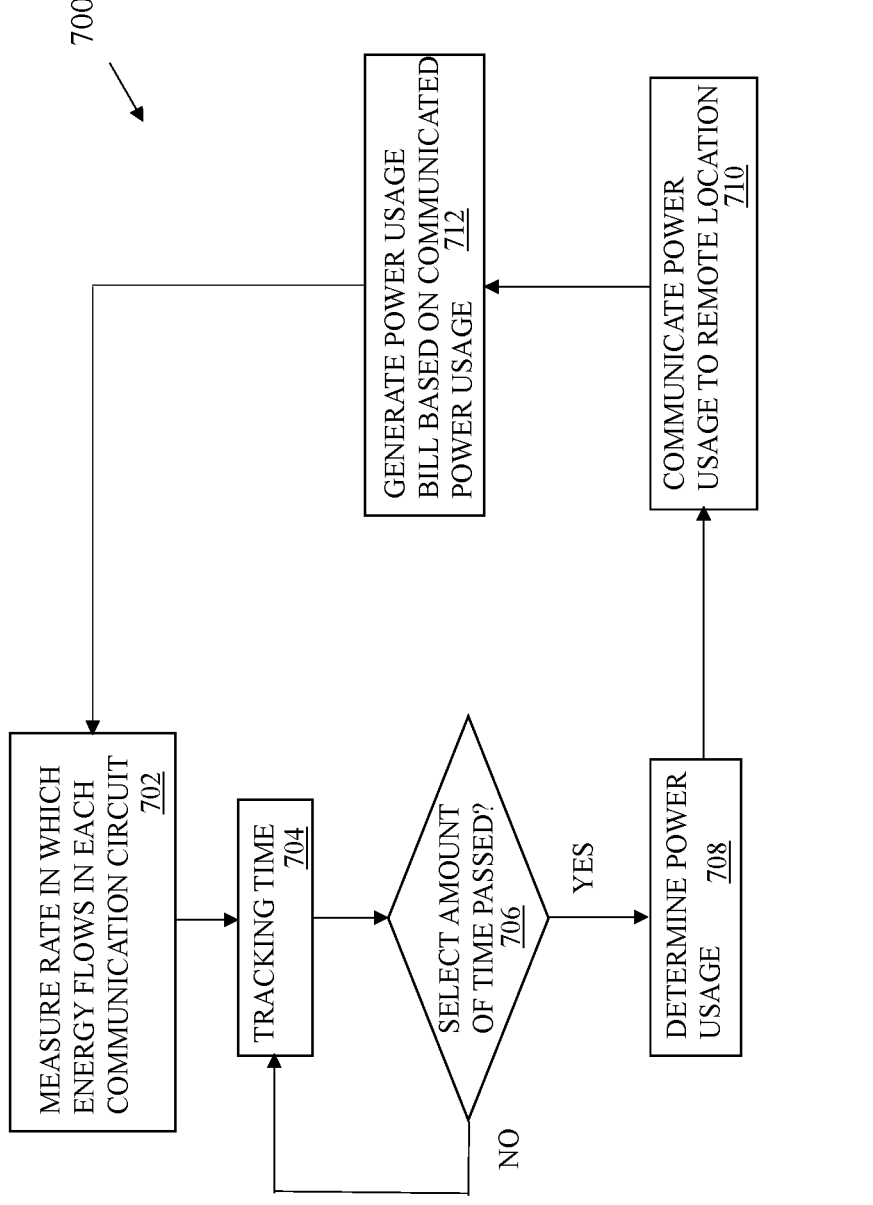
FIG. 7 illustrates a power usage flow diagram according to one exemplary embodiment.

Referring to FIG. 7, a power usage flow diagram 700 of an example embodiment is illustrated. The power usage flow diagram is provided as a series of sequential blocks. The sequence of the blocks my occur in a different order or in parallel in other embodiments.

The process starts at block 702, where the rate in which the energy flows in each communication circuit is measured. As discussed above, a communication circuit in one example embodiment may include a select power communication circuit 350, and associated power cable 114, an associated RRH 130 and an associated DC power signal voltage control module 140. In one embodiment, the rate of energy flow is determined with a current sensor 312 of an associated power communication circuit 350. At block 704 time is tracked.

It is determined at block 706 if a select amount of time has passed. The select amount of time is based on a period of time in which power consumption is wanted to be determined. For example, it may be by the hour, day, week, month, etc. If the select amount of time has not passed at block 706, the process continues at block 704 tracking time.

Once it is determined at block 706, the select amount has passed, power usage of the communication circuit over the period of time is determined at block 708. The power usage is then communicated to a remote location at block 710. The communication may occur at a scheduled time and duration once the power consumption over the period of time is determined or it may be communicated right after the power consumption is determined. The communication may occur wirelessly or through a wired communication link via the communication interface 110. The remote location may be a remote server associated with a base station. The remote location uses the power usage data to generate a bill to be charged to a radio operator associated with the communication circuit at block 712. If a radio operator is associate with more than one communication circuit the power usage of their associated communication circuits may be added up. The process then continues at block 702.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

EXAMPLE EMBODIMENTS

Example 1 is a cellular base station that includes a baseband unit, at least one programmable power supply and a communication interface. The baseband unit is in communication with a backhaul communication system and a radio. The at least one programmable power supply is configured to provide power to the radio through a communication circuit. The communication interface is in communication with the programmable power supply. The communication interface is configured to provide communications between the programmable power supply and a remote location regarding the communication circuit.

Example 2 includes the cellular base station of Example 1 wherein the communication interface is a wireless communication interface.

Example 3 includes the cellular base station of any of the Examples 1-2, wherein the at least one programmable power supply includes at least one power communication circuit and a controller. The at least one power communication circuit includes an input port, a power conversion circuit, an output port and a current sensor. The input port is coupled to receive an input power signal. The power conversion circuit is coupled to an output of the input port. The power conversion circuit is configured to convert an input voltage of the input power signal to a select voltage. The output port is coupled to an output of the power conversion circuit. The output port is further coupled to a power cable that provides power to operate the radio. The current sensor is coupled to measure current at the output port. The controller is in communication with the current sensor. The controller is configured to determine at least one of a voltage level at the radio and rate in which energy is flowing through the power conversion circuit based at least in part on the measured current by the current sensor. The controller is further in communication with the communication interface to communicate at least one of the determined voltage level at the radio and a determined power consumption over a select period of time based on the rate in which the energy is flowing through the power conversion circuit.

Example 4 includes the cellular base station of Example 3, wherein the communications include at least one of monitored voltage, monitored current levels, resistances, programming instructions, energy usage and power consumption regarding the communication circuit.

Example 5 includes the cellular base station of Example 2, wherein the wireless communication interface is configured to communicate with a mobile device to establish a communication link between a controller of the programmable power supply and a remote server.

Example 6 includes the cellular base station of Example 5, wherein the mobile device further provides a communication link between the controller of the programmable power supply and a remote server.

Example 7 includes the cellular base station of Example 5, further includes a unique identifier that is located one of on and near an enclosure containing the at least one programmable power supply. The remote device being a mobile device configured to use the unique identifier to identify at least the programmable power supply.

Example 8 includes the cellular base station of any of the Examples 1-7, wherein the remote location includes a remote server configured to remotely monitor operations of the cellular base station by a communication link established through the communication interface.

Example 9 includes a cellular base station system including at least one remote radio head located at a top of a tower, a baseband unit, a power cable for each radio head, at least one programmable power supply, and communication interface. The baseband unit is in communication with a backhaul communication system. The baseband unit is further in communication the at least one remote radio head. Each power cable is coupled to provide power to an associated remote radio head. The at least one programmable power supply is coupled to provide power to each power cable. The communication interface is in communication with the programmable power supply. The communication interface is configured to provide communications between the programmable power supply and a remote server.

Example 10 includes the cellular base station system of Example 9, wherein the at least one programmable power supply includes a power communication circuit for each power cable. Each power communication circuit includes an input port, a power conversion circuit, an output port and a current sensor. The input port is coupled to receive an input power signal. The power conversion circuit is coupled to an output of the input port. The power conversion circuit is configured to convert an input voltage of the input power signal to a select voltage. The output port is coupled to an output of the power conversion circuit. The output port is further coupled to an associated power cable that provides power to operate an associated radio head. The current sensor is coupled to measure current at the output port. The controller is in communication with the current sensor. The controller is configured to determine at least one of a voltage level at the radio head and a rate in which energy is flowing through the power conversion circuit based at least in part on the measured current by the current sensor. The controller is further in communication with the communication interface to communicate at least one of the determined voltage level at the radio and a determined power consumption over a select period of time based on the rate in which the energy is flowing through the power communication circuit.

Example 11 includes the cellular base station system of Example 10, wherein the communication interface further allows the controller to be remotely programmed.

Example 12 includes the cellular base station system of any of the Examples 9-11, wherein the communication interface is a wireless interface configured to communicate with a mobile device to establish a communication link between the controller of the programmable power supply and the remote server.

Example 13 includes the cellular base station system of Examples 12, further including a unique identifier that is located one of on and near an enclosure containing the at least one programmable power supply. The mobile device configured to use the unique identifier to identify at least the programmable power supply and enable communications through the communication interface.

Example 14 includes a method of communicating with a programmable power supply of a cellular base station, the method includes entering in a device identifier with a mobile device; scanning in an identification marker; verifying if the entered device identifier is associated with the scanned identification marker; and establishing a wireless communication link between the mobile device and the programmable power supply.

Example 15 includes the method of Example 14, further including, collecting cellular base station information; and transmitting the collected cellular base station information through the wireless communication link to the mobile device.

Example 16 includes the method of any of the Examples 14-15, further including, provisioning the cellular base station through the wireless communication link.

Example 17 includes a method of providing cellular base station information to a remote location, the method includes gathering information related to at least one communication circuit that provides power to an associated remote radio head with a controller of a programmable power supply; and communicating the gathered information through a communication interface to a remote location.

Example 18 includes the method of Example 17, wherein communicating the gathered information through a communication interface to a remote location is done wirelessly.

Example 19 includes the method of any of the Examples 17-18, wherein gathering information further includes at least one of: gathering a rate of energy flow through the at least one communication circuit; and gathering voltage measurements at the remote radio head.

Example 20 includes the method of and of the Examples 17-19, further including, determining power usage of the at least one communication circuit based on the gathered rate of energy flow through the at least one communication circuit over a select period of time, the gathered information including the determined power usage communicated to remote location.

The invention claimed is:

1. A cellular base station comprising:
a baseband unit in communication with a backhaul communication system and a radio;
at least one programmable power supply configured to provide power to the radio through a communication circuit;
a communication interface in communication with the programmable power supply, the communication interface configured to provide communications between the programmable power supply and a remote location regarding the communication circuit;
an output port configured to be coupled to a power cable that provides the power to the radio;
a current sensor coupled to measure current at the output port; and a controller in communication with the current sensor, the controller configured to determine a rate in which energy is flowing through the at least one power supply based at least in part on the measured current by the current sensor, the controller further in communication with the communication interface to communicate a determined power consumption over a select period of time based on the rate in which the energy is flowing through the at least one programable power supply.

2. The cellular base station of claim 1, wherein the communication interface is a wireless communication interface.

3. The cellular base station of claim 1, wherein the at least one programmable power supply comprises:
at least one power communication circuit including,
an input port coupled to receive an input power signal,
a power conversion circuit coupled to an output of the input port, the power conversion circuit configured to convert an input voltage of the input power signal to a select voltage,
the output port coupled to an output of the power conversion circuit of the power conversion circuit, and
the controller further configured to determine a voltage level at the radio and the rate in which energy is flowing through the at least one power supply is based at least in part on the measured current by the current sensor through the power conversion circuit of the at least one power supply, the controller further in communication with the communication interface to communicate the determined voltage level at the radio.

4. The cellular base station of claim 3, wherein the communications include at least one of monitored voltage, monitored current levels, resistances, programming instructions, energy usage and power consumption regarding the communication circuit.

5. The cellular base station of claim 2, wherein the wireless communication interface is configured to communicate with a mobile device to establish a communication link between a controller of the programmable power supply and a remote server.

6. The cellular base station of claim 5, wherein the mobile device further provides a communication link between the controller of the programmable power supply and a remote server.

7. The cellular base station of claim 1, further comprising:
a unique identifier located one of on and near an enclosure containing the at least one programmable power supply, the remote device being a mobile device configured to use the unique identifier to identify at least the programmable power supply and one of cable resistance information and cable current safety rating information associated with the power cable that provides the power to the radio.

8. The cellular base station of claim 1, wherein the remote location includes a remote server configured to remotely monitor operations of the cellular base station by a communication link established through the communication interface.

9. A cellular base station system comprising:
at least one remote radio head located at a top of a tower;
a baseband unit in communication with a backhaul communication system, the baseband unit further in communication the at least one remote radio head;
a power cable for each remote radio head, each power cable coupled to provide power to an associated remote radio head;

at least one programmable power supply coupled to provide power to each power cable;

a communication interface in communication with the programmable power supply, the communication interface configured to provide communications between the programmable power supply and a remote server, wherein the communication interface is a wireless interface configured to communicate with a mobile device to establish a communication link between a controller of the at least one programmable power supply and a remote server; and a unique identifier located one of on and near an enclosure containing the at least one programmable power supply, the mobile device configured to use the unique identifier to identify at least the programmable power supply, enable communications through the communication interface, and access power cable information about each power cable.

10. The cellular base station system of claim 9, wherein the at least one programmable power supply comprises:

a power communication circuit for each power cable, each power communication circuit including, an input port coupled to receive an input power signal, a power conversion circuit coupled to an output of the input port, the power conversion circuit configured to convert an input voltage of the input power signal to a select voltage, an output port coupled to an output of the power conversion circuit, the output port further coupled to an associated power cable that provides power to operate an associated radio head, a current sensor coupled to measure current at the output port, and a controller in communication with the current sensor, the controller configured to determine at least one of a voltage level at the radio head and a rate in which energy is flowing through the power conversion circuit based at least in part on the measured current by the current sensor, the controller further in communication with the communication interface to communicate at least one of the determined voltage level at the radio and a determined power consumption over a select period of time based on the rate in which the energy is flowing through the power communication circuit.

11. The cellular base station of claim 10, wherein the communication interface further allows the controller to be remotely programmed.

12. The cellular base station of claim 10, wherein the communication interface is a wireless interface configured to communicate with a mobile device to establish a communication link between the controller of the programmable power supply and the remote server.

13. The cellular base station of claim 9, wherein the power cable information includes at least one of cable resistance information and cable current safety rating information.

14. A method of communicating with a programmable power supply of a cellular base station, the method comprising:

entering in a device identifier with a mobile device;

scanning in an identification marker;

verifying if the entered device identifier is associated with the scanned identification marker;

establishing a wireless communication link between the mobile device and the programmable power supply; and accessing power cable information stored in the mobile device that is associated with a power cable that couples power between the programable power supply and a remote radio head.

15. The method of claim 14, further comprising:

collecting cellular base station information; and transmitting the collected cellular base station information through the wireless communication link to the mobile device.

16. The method of claim 14, further comprising:

provisioning the cellular base station through the wireless communication link.

17. A method of providing cellular base station information to a remote location, the method comprising:

gathering information related to at least one communication circuit that provides power to an associated remote radio head with a controller of a programmable power supply;

communicating the gathered information through a communication interface to a remote location;

gathering a rate of energy flow through the at least one communication circuit; and determining power usage of the at least one communication circuit based on the gathered rate of energy flow through the at least one communication circuit over a select period of time, the gathered information including the determined power usage communicated to the remote location.

18. The method of claim 17, wherein communicating the gathered information through a communication interface to a remote location is done wirelessly.

19. The method of claim 17, wherein gathering information further includes at least one of:

generating a power usage bill at the remote location based on the communicated power usage.

20. The method of claim 19, further comprising:

identifying the at least one communication circuit with a unique identifier using a camera of a mobile device; and accessing power cable information stored on the mobile device when the at least one communication circuit is identified with the unique identifier, wherein the power cable information is related to a power cable of the at least one communication circuit.

* * * * *